US010035175B2

(12) United States Patent
Gorodetsky et al.

(10) Patent No.: US 10,035,175 B2
(45) Date of Patent: Jul. 31, 2018

(54) DYNAMIC INFRARED-REFLECTIVE MATERIALS BASED ON REFLECTIN FILMS

(71) Applicant: The Regents of the University of California, Oakland, CA (US)

(72) Inventors: Alon Gorodetsky, Irvine, CA (US); Long Phan, Irvine, CA (US); David Ordinario, Irvine, CA (US); Emil Karshalev, San Diego, CA (US); Michael Shenk, Covina, CA (US); Ward Gale Walkup, IV, Pasadena, CA (US)

(73) Assignee: The Regents of the University of California, Oakland, CA (US)

( * ) Notice: Subject to any disclaimer, the term of this patent is extended or adjusted under 35 U.S.C. 154(b) by 58 days.

(21) Appl. No.: 14/723,772

(22) Filed: May 28, 2015

(65) Prior Publication Data

US 2015/0346398 A1    Dec. 3, 2015

Related U.S. Application Data

(60) Provisional application No. 62/003,915, filed on May 28, 2014, provisional application No. 62/007,713, filed on Jun. 4, 2014, provisional application No. 62/024,771, filed on Jul. 15, 2014, provisional application No. 62/111,936, filed on Feb. 4, 2015.

(51) Int. Cl.
| | | |
|---|---|---|
| *B05D 3/10* | (2006.01) | |
| *B05D 5/06* | (2006.01) | |
| *B05D 1/02* | (2006.01) | |
| *B05D 1/00* | (2006.01) | |
| *B05D 3/12* | (2006.01) | |
| *B32B 5/02* | (2006.01) | |
| *B32B 9/02* | (2006.01) | |
| *C09D 189/00* | (2006.01) | |
| *G02B 5/08* | (2006.01) | |
| *G02B 1/10* | (2015.01) | |
| *G02B 5/26* | (2006.01) | |

(52) U.S. Cl.
CPC .......... *B05D 3/107* (2013.01); *B05D 1/005* (2013.01); *B05D 1/02* (2013.01); *B05D 3/12* (2013.01); *B05D 5/063* (2013.01); *B32B 5/02* (2013.01); *B32B 5/022* (2013.01); *B32B 5/024* (2013.01); *B32B 5/026* (2013.01); *B32B 9/02* (2013.01); *C09D 189/00* (2013.01); *G02B 1/10* (2013.01); *G02B 5/0841* (2013.01); *G02B 5/26* (2013.01); *B05D 2203/00* (2013.01); *B05D 2401/10* (2013.01); *B32B 2307/416* (2013.01); *Y10T 428/2848* (2015.01); *Y10T 428/3154* (2015.04)

(58) Field of Classification Search
CPC  B32B 5/02; B32B 5/022; B32B 5/024; B32B 5/026; B32B 9/02; B32B 2307/416; B32B 2301/0418; C09D 189/00; B05D 1/005; B05D 1/02; B05D 3/12; B05D 3/107; B05D 5/063; B05D 2203/00; B05D 2401/10
USPC ............ 106/124.1; 156/229, 273.3; 359/350, 359/359; 427/162, 171, 176, 331, 336, 427/337, 338, 412, 414
See application file for complete search history.

(56) References Cited

U.S. PATENT DOCUMENTS

| | | | | |
|---|---|---|---|---|
| 7,328,962 | B2* | 2/2008 | Higuchi | B41J 2/0451 347/19 |
| 2012/0135448 | A1* | 5/2012 | Parker | C12N 5/0068 435/29 |
| 2015/0329604 | A1* | 11/2015 | Parker | C07K 14/435 424/401 |

OTHER PUBLICATIONS

Phan et al., "Reconfigurable Infrared Camouflage Coatings from a Cephalopod Protein," Adv. Mater. 2013, 25, 5621-5625.*
Ordinario et al., "Bulk protonic conductivity in a cephalopod structural protein," Nature Chemistry, vol. 6, Jul. 2014, 596-602, published online Jun. 1, 2014.*
Phan et al., "Infrared invisibility stickers inspired by cephalopods," J. Mater. Chem. C, 2015, 3, 6493.*
Qin et al., "Recombinant Reflectin-Based Optical Materials," Journal of Polymer Science, Part B: Polymer Physics 2013, 51, 254-264. (Year: 2013).*
Ordinario et al., "Protonic transistors from thin reflectin films," APL Materials 3, 014907 (2015). (Year: 2015).*
Ordinario et al., "Photochemical Doping of Protonic Transistors from a Cephalopod Protein," Chem. Mater. 2016, 28, 3703-3710. (Year: 2016).*
Phan et al., "Infrared invisibility stickers inspired by cephalopods," J. Mater. Chem. C, 2015, 3, 6493. (Year: 2015).*
Phan et al., "Dynamic Materials Inspired by Cephalopods," Chem. Mater. 2016, 28, 6804-6816. (Year: 2016).*
Omenetto et al., Dynamic Camouflage Materials Based on Silk-Reflectin Chimeras, AFRL-OSR-VA-TR-2012-0993, Jan. 8, 2012, 5 pages. (Year: 2012).*
Rossiter et al., "Colour gamuts in polychromatic dielectric elastomer artificial chromatophores," Electroactive Polymer Actuators and Devices (EAPAD) 2014, edited by Yoseph Bar-Cohen, Proc. of SPIE, vol. 9056, 905620, 2014, 8 pages. (Year: 2014).*
Wang et al., "Cephalopod-inspired design of electro-mechano-chemically responsive elastomers for on-demand fluorescent patterning," Nature Communications, 5:4899, 9 pages, Sep. 16, 2014. (Year: 2014).*
Rossiter et al., "Biomimetic chromatophores for camouflage and soft active surfaces," Bioinspir. Biomim. 7 (2012) 036009 (10 pp). (Year: 2012).*

(Continued)

*Primary Examiner* — William P Fletcher, III

(57) ABSTRACT

Reflectin proteins are proteins derived from cephalopods (certain species of squid) which have unusual optical properties. Disclosed herein are thin films of reflectin proteins which can be tuned to reflect infrared light. Advantageously, the films can be tuned dynamically over short time scales, to reflect at different wavelengths. Disclosed herein are novel infrared-reflective coatings, methods of making such coatings, and infrared-reflective objects such as textiles, building materials, and camouflage materials.

8 Claims, 1 Drawing Sheet

(56) References Cited

OTHER PUBLICATIONS

Figure 1A:
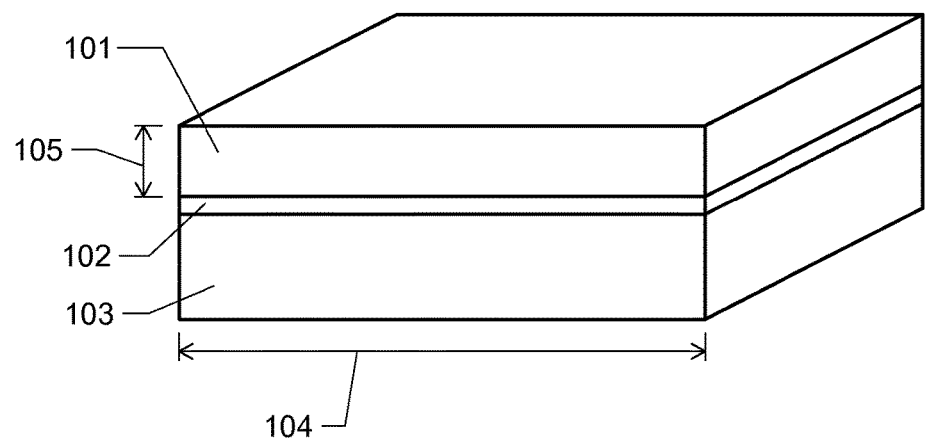

Kaplan, T., "The pathway leading to the conformational change of reflectin to produce color change in cephalopods," Eukaryon, vol. 12, Mar. 2016, Lake Forest College, 6 pp. (Year: 2016).*

"Thin-film interference," https://en.wikipedia.org/Thin-film_interference, retrieved Oct. 1, 2017, 7 pages. (Year: 2017).*

Phan et al., "Reconfigurable Infrared Camouflage Coatings from a Cephalopod Protein," Adv. Mater. 2013, 25, 5621-5625. (Year: 2013).*

Kramer et al., "The self-organizing properties of squid reflectin protein," Nature Materials, vol. 6, Jul. 2007, 533-538, published online Jun. 3, 2007. (Year: 2007).*

Naughton et al., "Self-Assembly of the Cephalopod Protein Reflectin," Adv. Mater. 2016, 28, 8405-8412. (Year: 2016).*

Phan et al., "Reconfigurable Infrared Camouflage Coatings from a Cephalopod Protein," Advanced Materials, vol. 25, Issue 39, pp. 5621-5625, ( 2013).

* cited by examiner

DYNAMIC INFRARED-REFLECTIVE MATERIALS BASED ON REFLECTIN FILMS

CROSS-REFERENCE TO RELATED APPLICATIONS

This application claims the benefit of priority to: U.S. Provisional Application Ser. No. 62/003,915, entitled "Reflectin Thin Film Compositions and Methods," filed May 28, 2014; U.S. Provisional Application Ser. No. 62/007,713, entitled "Textiles Having Dynamically Controlled IR Reflectance," filed Jun. 4, 2014; U.S. Provisional Application Ser. No. 62/024,771, entitled "Building Materials Having Dynamically Controlled IR Reflectance," filed Jul. 15, 2014; and U.S. Provisional Application Ser. No. 62/111,936, entitled "Infrared Invisibility Stickers," filed Feb. 4, 2015, the contents which are hereby incorporated by reference.

REFERENCE TO SEQUENCE LISTING, A TABLE, OR A COMPUTER PROGRAM LISTING COMPACT DISK APPENDIX

Not Applicable.

Statement regarding federally sponsored research or development: This invention was made with Government support under grant number FA9550-14-1-0144, awarded by the United States Air Force, grant numbers HR0011-15-1-0008 and HR0011623631-00 awarded by the Defense Advanced Research Projects Agency (DARPA) and grant number DBI-1306188, awarded by the National Science Foundation. The Government has certain rights in the invention.

BACKGROUND OF THE INVENTION

Thermal management presents a substantial engineering challenge at both small and large scales, and across many contexts. For example, a person outdoors will typically be exposed to a constantly changing range of ambient temperatures depending on solar radiation, air temperature, cloud cover, wind, and other factors that can cause dramatic temperature swings over short time scales. Additionally, the person's level of physical activity will change over short time scales depending on their level of activity (e.g. sedentary vs. walking vs. strenuous work or exercise) and this will have a large impact on the person's thermal status. Thermal management is an issue at larger scales as well, for example in heat management of buildings and other structures, where excess heat often needs to be removed in order to keep the interior of the building comfortable or interior heat needs to be retained against loss to the environment to keep the building sufficiently warm.

Thermal management can be aided by the use of infrared reflecting coatings known in the art, including gold, aluminum, polyvinylidene fluoride, and fibrous clays. However, such coatings have various shortcomings such as expense, toxic manufacturing processes, and limited compatibility with textiles and other soft substrates. More fundamentally, the prior art IR coatings are not dynamic and their IR reflectance cannot be tuned to respond to constantly changing thermal conditions.

Accordingly, there is a need in the art for novel IR coatings that reflect substantial amounts of IR radiation. There is also a need in the art for IR coatings that can be applied to soft materials such as fibers and textiles. There is also a need in the art for non-toxic IR coatings derived from natural sources. And there is a completely unmet need in the art for dynamic IR coatings having a tunable IR reflectance. These and other needs are met by the inventions disclosed herein.

SUMMARY OF THE INVENTION

Disclosed herein are thin films of reflectin proteins. Reflectin proteins are proteins derived from cephalopods (certain species of squid) which have unusual optical properties. The inventors of the present disclosure have advantageously developed practical applications of the reflectin proteins which provide the art with numerous useful inventions. Disclosed herein are novel IR reflective coatings, methods of making such coatings, and IR-reflective objects such as textiles and building materials. Further included in the present disclosure are infrared coatings having tunable IR reflectance, wherein IR transmissiveness and IR reflectance can be tuned over short time scales.

BRIEF DESCRIPTION OF THE SEVERAL DRAWINGS

FIG. 1A. FIG. 1A is a diagram depicting a reflectin film (101) adhered to a flexible substrate (103) by an intervening layer of graphene oxide (102). The film has length of L (104) and a thickness of t (105) when no tension is applied.

Figure 1B:
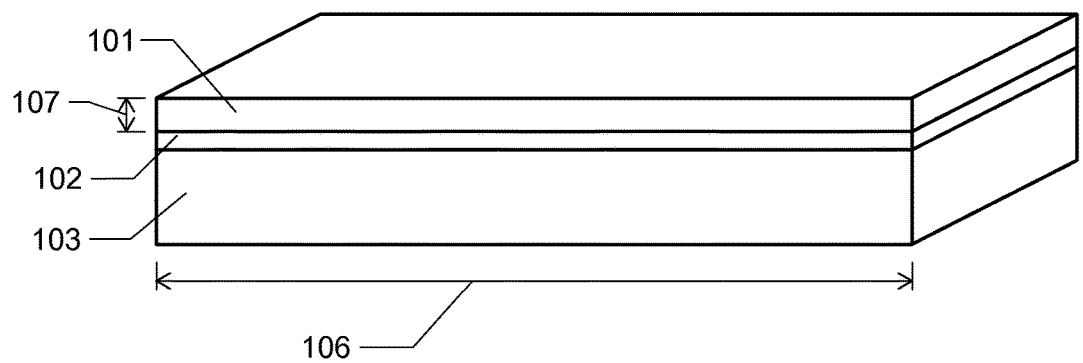

FIG. 1B. FIG. 1B is a diagram depicting the same reflectin film (101), graphene oxide intervening layer, and flexible substrate (103) after application of stretching forces. The stretched film has an increased length of L+ΔL (106) and a decreased thickness of t−Δt (107).

DETAILED DESCRIPTION OF THE INVENTION

The invention comprises the use of reflectin thin films as IR reflecting materials. These thin films may be applied to various substrates and used as coatings on a wide variety of target objects, such as textiles and building materials. Additionally, the invention is directed to dynamically tuned IR reflective material, wherein the infrared (IR) reflectance of the material may be altered over short time scales, such that the material will controllably transmit or reflect IR as desired, to aid in thermoregulation of objects, or to alter the IR visibility of objects. A detailed description of the reflectin thin films, methods of coating them to materials, and the various target objects that may employ them is presented next.

Part 1: Reflectin Thin Films

1A. Reflectins. The thin films of the invention comprise reflectin proteins. Reflectin proteins include all known isoforms of reflectin, as known in the art. Exemplary reflectins include those described in Crookes et al., Reflectins: The Unusual Proteins of Squid Reflective Tissues, Science 303 (9):235-238 (2004) and Kramer et al., The self-organizing properties of squid reflectin protein, Nat Mater. 2007 July; 6(7):533-8. (2007). Exemplary reflectin protein sequences further include those described in U.S. Pat. No. 7,314,735, Identification and characterization of reflectin proteins from squid (Goodson et al.).

Exemplary reflectin protein sequences include the reflectin A1 protein from *Doryteuthis pealeii* (Also referred to as reflectin-like protein A1; GenBank Accession Number ACZ57764.1). Exemplary reflectin protein further include the reflectin A2 protein from *Doryteuthis pealeii* (Also referred to as reflectin-like protein A2; GenBank Accession Number ACZ57765.1), and the reflectin B1 protein from

*Doryteuthis pealeii* (Also referred to as reflectin-like protein B1; GenBank Accession Number ACZ57766.1). Exemplary reflectin protein further include the reflectin 1a protein from *Euprymna scolopes* (GenBank Accession Number AAQ21389.1), the reflectin 1b protein from *Euprymna scolopes* (GenBank Accession Number AAQ21390.1), the reflectin 2a protein from *Euprymna scolopes* (GenBank Accession Number AAQ21392.1), the reflectin 2b protein from *Euprymna scolopes* (GenBank Accession Number AAQ21393.1), the reflectin 2c protein from *Euprymna scolopes* (GenBank Accession Number AAQ21394.1) the reflectin 2d protein from *Euprymna scolopes* (GenBank Accession Number AAQ21395.1), and the reflectin 3a protein from *Euprymna scolopes* (GenBank Accession Number AAQ21391.1). Exemplary reflectin protein further include the reflectin like protein from *Sepia offcinalis* (GenBank Accession Number CCG28048.1), and the reflectin 1-11 proteins from *Sepia offcinalis* (GenBank Accession Numbers: CCG28037.1, CCG28038.1, CCG28039.1, CCG28040.1, CCG28041.1, CCG28042.1, CCG28043.1, CCG28044.1, CCG28045.1, CCG28046.1, and CCG28047.1).

Reflectins of the invention further include variants, homologs, and modified versions of known native reflectin protein sequences. For example, reflectins, as used herein, encompass any polypeptide having some degree of sequence similarity or identity to a known reflectin sequence and having some degree of reflectin functionality. This includes sequences having 30-99% sequence identity or similarity (for example 70%, 75%, 80%, 85%, 90%, 95%, or 99% identity of similarity) to a known reflectin polypeptide sequence and retaining the high refractive index of native reflectin. Variants of reflectin further include polypeptides comprising reflectin sequences in which one or more amino acids have been substituted, truncated reflectin sequences, and recombinant proteins comprising one or more reflectin domains.

It will be understood that with respect to the methods and compositions of the invention, structures comprising reflectins are not limited to a single reflectin protein type, and that mixtures of two or more different reflectins may be utilized.

Reflectins for use in thin films may be isolated from natural sources (squid, for example as a byproduct of food processing) or may be produced by recombinant protein production methods known in the art, including bacterial, yeast, insect, and other prokaryotic or eukaryotic cell system, as well as cell-free systems known in the art. For example, reflectins may be produced in *E. coli* expression systems, for example utilizing His-tagged reflectin A1 for facile harvesting and purification. It will be understood that native reflectin gene sequences will be codon-optimized when expressed in foreign hosts to ensure proper transcription and translation, as known in the art.

1B. Reflectin Thin Films. Thin film fabrication may be performed using any method known in the art for the production of thin films of proteins and peptides. For the creation of films, reflectin protein is preferably essentially purified, such that substantial amounts of contaminants are not present. Subsequently, a solution of reflectin protein is then made. Exemplary solvents include water and hexafluoroisopropanol. This solution is then applied to the substrate, for example by spin casting, sputtering, blading, or any other deposition method known in the art. Subsequently, the film is dried and as the solvent evaporates, a stable thin film of reflectin protein self-assembles.

In one embodiment, the thin film of reflectin is created by the use of doctor-blading. A solution of reflectin protein is prepared, for example 200-1000 µM reflectin, for example 500 µM, in water. The solution is applied to the substrate, for example by pumping. A blade, for example made from polyethylene plastic sheeting, is run over the applied solution to create a smooth layer. Two parallel rails, spaced at the approximate width of the blade, are present on the substrate, and such rails fix the height of the blade above the substrate. The rails may comprise any structure of substantially even height, for example tape, for example Teflon tape having a height of about 150 µM. The angle of the blade may be adjusted for optimal application of the protein solution. In general, a lower blade angle results in a thicker film. For example, a blade angle of 45-85 degrees, for example in the range of 60-70 degrees, may be utilized. The speed of the blade can vary, for example in the range of multiple cm per second to multiple cm per minute. For example, a blade speed of 4 cm per minute may be utilized.

Exemplary rail heights include those in the range of 100-200 µM. Thicker films generally require a higher concentration of protein in the solution, and a more volatile solution and/or active drying to create consistent films free of defects.

Active drying increases the uniformity and quality of the film. Active drying can be any treatment which aids in the rapid evaporation of solvent from the protein solution once it has been applied to the substrate. For example, active drying may comprise heating of the substrate from below, or blowing a current of gas over the material behind the blade (for example heated air).

In one embodiment, the reflectin thin film comprises a multi-layered film. Multiple layers of reflectin thin films can be created by directly depositing successive layers of films upon one another until a height that achieves efficient IR reflection is attained (e.g. greater than about 250 nm for reflectin films deposited onto materials having a higher index of refraction than reflectin). In an alternative embodiment, the films are deposited onto a transparent polymer substrate, and two or more such substrate-reflectin film assemblies are stacked one on top of another, with bonding achieved by the adhesive or chemical properties of the polymer substrate (for example, a negatively charged polymer will be attracted to the positive reflectin proteins). Exemplary polymer substrates include fluorinated ethylene propylene tape. Other exemplary polymer substrates include polyethylene and cyclic olefin polymer since they are clear and share a similar refractive index (~1.54 at IR wavelengths) as reflectin. The optical properties of the polymer substrate must be accounted for, and substantially transparent materials are preferred in some embodiments.

1C. Reflectin Thin Film IR Reflectance. The thickness of the reflectin film will affect its reflectance, in accordance with thin-film interference theory, as known in the art. Reflectin films have a reflectance spectra that is red-shifted with increasing film thickness. For example, a 125 nm reflectin A1 film is blue in color, while a thicker 227 nm reflectin A1 film is orange in color. Reflectin thin film reflectance can be predicted by standard optics equations, for example, Equation 1:

$$m*\lambda = 2*n*d \qquad \text{Equation 1:}$$

where m is an integer that describes wavelength order, λ is the peak reflected wavelength, n is the refractive index of the film, and d is the film thickness, as described in Appendix A. For example, reflectin's refractive index at 589.6 nm is 1.5376. Films that reflect in IR wavelengths, for example, wavelengths in the range of 700-1200 nm, will typically be about 250 to 400 nm in thickness. Thin-film interference theory predicts that a reflectin film having a thicknesses of 394 nm will have a peak reflectance at a wavelength of 1200 nm, a reflectin film having a thickness of 427 nm will have a peak reflectance at a wavelength of 1300 nm, a reflectin film having a thickness of 460 nm will have a peak reflectance at a wavelength of 1400 nm, and a reflectin film having a thickness of 493 nm will have a peak reflectance at a wavelength of 1500 nm. Remarkably, in practice there is only a very slight deviation observed between the predicted and actual reflectance of reflectin thin films, with actual reflectance values falling within 5% of the predicted value.

As described below, reflectin thin films are applied with the intention of reflecting IR wavelengths via thin film interference. Accordingly, the thickness and refractive index of the materials underlying the reflectin thin film must be accounted for when selecting substrates and any intervening layer materials, as described below. For example, at least one layer underlying the reflectin thin film may have a higher refractive index than the overlaying reflectin thin film in order to enable thin film interference and reflectance of the desired wavelengths. Reflectance may also be achieved with substrates having a lower index of refraction than reflectin, as illustrated in Example 1. The optical properties of a layer stack can be determined empirically, or by the application of standard optics equations, as known in the art, taking into account the refractive index and other optical properties of the reflectin thin film and the material upon which the film is deposited as well as the optical properties of any intervening layer(s). Advantageously, the use of graphene oxide as an intervening layer, as described below, has only a small effect on the reflectance of overlying reflectin thin films (~5%).

1D. Substrates and Intervening Layers. Thin films of reflectins are applied to a substrate. As used herein, "substrate" refers to an object, material, or surface to which the reflectin film is directly or indirectly adhered, for example, a fiber, a textile, a tile, a window pane, or a particle. In some embodiments, the thin film of reflectin is directly bonded to substrate. In some embodiments, the connection between the substrate and the target object comprises one or more intervening layers.

The selection of the substrate will depend upon the intended function of the reflectin film. For example, to create an IR-reflecting tile, the target object will be the surface of a tile, or may comprise a fiber or particle which will be incorporated into or coated onto a finished tile. The selected substrate will typically have a surface chemistry capable of binding reflectin proteins, by any means including hydrostatic, ionic, covalent, or other binding interactions. Reflectins are generally positively charged and hydrophobic. Accordingly, preferred materials for substrates are those having negative charge and/or hydrophobicity. Hydrophobic materials may be entirely hydrophobic or may be amphipathic, having partial hydrophobic properties. The selection of substrate material and/or surface modifications for improving the material's affinity for reflectin protein is within the skill of one in the art of material science. In other embodiments, multiple intervening layers are utilized, each such layer being capable of adhering to the material below it and above it, with the lowermost layer being capable of adhering to the target object and the uppermost layer being capable of adhering to reflectin proteins. The use of multiple layers allows for the application of reflectin thin films to target objects where direct adhesion to the substrate is not practical due to divergent surface chemistries.

The selection of materials for the substrate and intervening layers, if any, will also be guided by the optical properties of the layer stack, and substrates or any intervening layers must have an index of refraction selected to acheive reflectin thin film interference to enable effective IR reflectance.

An exemplary intervening layer material is graphene oxide. Graphene oxide is negatively charged and amphipathic and will stably and strongly bind reflectin proteins. Graphene oxide is also readily deposited on various materials utilizing known methodologies. Advantageously, graphene oxide is inexpensive and water soluble, making it easy to utilize in manufacturing. Thin films of graphene oxide, for example in the range of 5-10 nm, may be deposited on the target object (or intervening layer, as the case may be) using methods known in the art, for example by spincasting. Another exemplary class of materials for the intervening layer is the alkanethiol compounds, which readily form self-assembled monolayers on a number of surfaces. The use of alkanethiol compounds is well known in the art, for example as described in Love et al., Self-Assembled Monolayers of Thiolates on Metals as a Form of Nanotechnology, Chem. Rev. 2005, 105, 1103-1169 Alkanethiols have head and tail groups. The head group of the alkanethiol can be selected for effective bonding to the substrate, and the tail group is capable of modification (e.g. to impart negative charge and/or hydrophobicity) such that it can effectively bind or adhere to reflectin proteins. For example, the preparation of alkanethiol films on silicon is described in Sano et al, Alkanethiol Self-Assembled Monolayers Formed on Silicon Substrates, *Japanese Journal of Applied Physics*, Volume 49 (2010).

Part 2. Dynamic IR Reflectance of Reflectin Films.

As set forth above, the wavelength reflectance profile of reflectin thin films is dependent upon the thickness of the film, with thinner films reflecting in the visible spectrum and thicker films (e.g. films having a thickness greater than 250 nm) reflecting IR light (e.g. wavelengths greater than 750 nm). Due to reflectin's unusual properties, various stimuli may be used to alter the thickness of a film, such that its wavelength reflectance spectrum can be changed over short time scales. This advantageously allows the use of reflectin thin films in dynamic applications where changing the IR reflectance of a material is desirable. The various stimuli that can be used to alter reflectin film thickness are described next.

2A. Chemical Stimulus. Reflectin films can be swollen by various means. Specifically, chemical treatment can be used to swell the film, increasing its thickness. With swelling, a film can be swelled to 125-200% of its original height, red shifting its peak reflectance. For example, as demonstrated in Reconfigurable Infrared Camouflage Coatings from a Cephalopod Protein, by Phan et al., Advanced Materials, Volume 25, Issue 39, pages 5621-5625, (2013), a film of 200 nm thickness will reflect IR wavelengths poorly, but when swollen with acetic acid vapor, the film attain a thickness of 400 nm and will more effectively reflect in the IR region.

Chemical treatment to induce swelling includes exposure to water vapor, acid vapors and other proton-donating species. Aqueous acidic conditions, as used herein, means atmospheric conditions in which relative humidity exceeds 50% and pH is less than 7.0. Effective aqueous acidic conditions include relative humidities of 70-99%, and vapor from solutions having a pH of 1-4. Films can be subjected to aqueous acidic conditions by sealing them within a substantially airtight containment means in which aqueous acidic solutions or vapors are present. Exemplary acidic solutions include Glacial/Neat acetic acid, hydrochloric acid, sulfuric acid, etc. Complete swelling will typically occur within exposure times of 5-60 minutes, for example, 15 minutes. Containment means include enclosing films within coatings, vessels, flexible wraps (such as sheeting or films made of vinyl, polyethelene, and other plastic or polymeric material), and other covers (for example having soft gaskets along edges) into which aqueous acidic vapor can be introduced and maintained.

Without being bound to any specific theory, it is believed that that protonation of the reflectin proteins causes swelling of the reflectin film due to inter- and intra-protein repulsion. The uptake of positive charge (protons) may lead to the protonation of basic residues (arginine, lysine, and histidine) and the neutralization of acidic residues (glutamic and aspartic acid), shifting the net charge of the reflectin and increasing repulsive forces between proteins, increasing the thickness of the film. Accordingly, the chemical stimuli of the invention comprises the use of any stimulus which promotes the protonation of basic residues within the reflectin thin film.

The opposing process of film shrinkage can be achieved by reducing or removing the chemical stimulus (e.g. acidic vapor) and allowing the film to return to its, thinner, unswollen state.

2B. Electrical Stimulus. In some embodiments, an electrical stimulus may be used to induce swelling of the reflectin film, for example exposure of the film to a proton current or an external electric field to induce the movement of protons from a source material into the film material, which causes swelling of the film. Upon introduction, the protons will move efficiently through the reflectin protein matrix. For example, the excellent proton conductivity of the reflectin films, and associated methods of injecting protons into the films, are described in Ordinario et al., 2014, Bulk Protonic Conductivity in a Cephalopod Structural Protein, Nature Chemistry 6:596-602.

For example, in one embodiment, the reflectin films are in contact with electrodes, proton sources, or proton-conductive materials and upon the application of an appropriate electrical impulse, protons are injected into the reflectin thin film and cause it to swell in size and increase reflectance to longer (e.g., IR) wavelengths. For example, application of a voltage bias by an electrode may be used to inject sufficient protons into the reflectin film material to cause swelling.

Exemplary electrodes for the introduction of proton currents to reflectin thin films include hydride electrodes. Exemplary hydride electrodes include palladium hydride (PdHx), LixMn2O4, Pt—PdHx alloys, PtHx, NiHx, or any metal hydride known in the art. Noble metals, being inert, are also useful materials for hydride electrodes. Other materials may be utilized as proton sources for injection of protons into reflectin thin films, including known proton conductors such as Nafion™, solid-state proton-conducting materials, such as ceramic oxides, solid acids, sulfonated polymers, porous solids, and metal-organic materials, as known in the art. Electrical impulses that inject protons may comprise voltage biases applied to the films, for example applied potentials less than 1.5 V, which is below the threshold for electrolysis, which helps to avoid hydrolysis reactions in hydrated reflectin films.

Structures for proton injection to increase film thickness may comprise reflectin films deposited upon proton-injecting materials, such as electrodes. For example, a proton-injecting substrate (e.g. thin film electrode) may be used. In one embodiment, the reflectin films are sandwiched between anode and cathode electrodes. In another embodiment, the film may be deposited onto patterned proton-injecting materials or structures (e.g. electrodes) of sufficient density and coverage to efficiently inject protons into the thin film, for example, such that the film is interspersed with proton-injecting materials or structures (e.g. electrodes). Electrodes of opposing polarity may be configured in arrays which create voltage differentials across overlaying reflectin thin films. Alternatively, the proton-injecting structures and circuits can be patterned on top of a previously deposited reflectin film. Proton-injecting structures are understood to further include associated wiring, circuitry, and voltage sources to enable activation of proton injection.

Conversely, the removal of protons from films can be used to reduce their thickness. Applied potentials that withdraw protons from the reflectin film may be applied, reducing film thickness and blue-shifting the peak reflectance wavelength and reflectance spectrum of the film.

The response of reflectin films to electrical stimulus is rapid, for example, occurring in time scales of seconds to minutes, depending upon the efficiency of proton injection. Film height may be increased by 120-200% by injection of protons.s An exemplary assembly comprising a reflectin film and hydride electrodes comprises reflectin films spanning a gap between two electrodes. Each electrode in the exemplary assembly is 100 μm×400 μm in size. The films are 100 μm×300 μm over each electrode and 300 μm×50 μm over the gap, such that for every 1 μm$^2$ of reflectin film, there is 1.77 μm$^2$ of electrode. Exemplary electrode and reflectin thin film assemblies are described in Ordinario et al., "Bulk protonic conductivity in a cephalopod structural protein," Nature Chemistry 6:596-602 (2014).

The hydration status of the reflectin film will affect the proton conductivity of the film, with more hydrated films having higher rates of protonic conductivity. For example, the films may be encased in an environment having a relative humidity of 10-90% with higher relative humidities promoting higher protonic conductivity. However, the reflectin films of the invention are water soluble and should be maintained in an environment wherein they are not exposed for prolonged periods to condensed liquid water, which will degrade the films. Films and electrode assemblies can be encased within water-proof, gas-impermeable coatings or encasements to maintain the hydration status of the film while protecting the films from external water. Exemplary coatings include ITO or graphene. Polymeric coating materials, as known in the art, may also be used. Flexible coatings that allow film swelling and shrinking of underlying films may be used. Films may optionally be hydrated by exposure to high relative humidities (e.g. 90%) and then subsequently be encased.

Summarizing the use of electrical stimuli to alter film thickness and reflectivity, in one aspect the invention encompasses methods for increasing the thickness of a reflectin film by the application of a proton current, electrical field, or other stimulus which injects protons into the film. In one embodiment, the invention comprises an assembly with dynamic reflectance comprising a reflectin thin film in contact with or interspersed with proton electrodes such as hydride electrodes. Such assembly may further comprise a control system for injecting/withdrawing protonic currents from the film, associated wiring and power supply, and gas-impermeable coatings or structures encasing the assembly. In one embodiment, the invention encompasses methods of changing the IR reflectance of an assembly with dynamic reflectance wherein the reflectin film, in an unstimulated state, has a peak wavelength reflectance of less than 700 nm and wherein a stimulation is applied that increases the film thickness such that its peak wavelength reflectance is greater than 700 nm.

2C. Elastic Deformation. The inventors of the present disclosure have advantageously discovered that reflectin films are flexible, and can be stretched to make them thinner, which blue-shifts their peak reflectance. Films may be stretched to about 115-120% of their length without permanent deformation and will return to their prior dimensions upon the release of tension. Accordingly, in one aspect, the invention comprises reflectin thin films deposited onto a flexible substrate, which such substrate is stretched and relaxed to decrease and increase, respectively, the thickness of the overlaying film. The reflectance spectrum of the film will change accordingly, e.g. being blue-shifted as it is stretched and red-shifted as relaxation causes the film to return to a thicker conformation. For example, a reflectin film which reflects in the IR region of the spectrum will be inconspicuous or invisible in visible light. Upon stretching, the film will thin and will begin to reflect at shorter wavelengths, so that if sufficiently stretched, it will become visible. Likewise, a reflectin film that reflects in the visible spectrum can be stretched such that it changes color (for example, from orange to blue).

The color change or change in IR reflectance as a result of stretching/relaxation of the reflectin film can be predicted based on the degree of stretching and the thickness of the unstretched film. The response of a thin film to strain can be described, for example, by the Poisson ratio, as known in the art. For example, under a strain of $\varepsilon x$, which is equivalent to $\Delta L/L$ (where L is the initial length and $\Delta L$ is the change in length), the film will be elongated by a factor of $1+\varepsilon$, from L to $L+\Delta L$. Due to the Poisson effect, the reflectin film's thickness will simultaneously decrease by a factor of $1-\nu\varepsilon$, from t to $t-\Delta t$ (where t is the initial thickness, $\Delta t$ is the change in thickness), where $\nu$ is Poisson's ratio, assumed to be about 0.48 for reflectin A1 films.

The flexible substrates which enable elastic changes in reflectin film reflectance spectra may comprise any flexible material, including fibers or sheets of material. For example, in one embodiment, the flexible substrates comprise substantially flat films, sheets, or planes. Exemplary substrates include polymeric materials, especially thin sheets or films of polymeric material, for example being 1 micron to 1 mm in thickness. Exemplary polymeric substrates include sheets of fluorinated ethylene propylene (FEP), polytetrafluoroethylene (PTFE), polyethylene, polyethylene terephthalate (PET), polypropylene, and polydimethyl sulfoxide. In one embodiment, the elastic substrate comprises a tape, e.g. a planar material having a first surface, upon which a reflectin thin film is directly or indirectly deposited, and a second opposing surface having adhesive properties or coated with an adhesive substance. In another embodiment, the flexible substrate comprises an elastic fiber. In another embodiment, the flexible substrate is a textile, for example a knit or weave being composed of elastic fibers and/or having sufficient elasticity to allow stretching and recovery of the fabric and thinning/thickening of an overlaid or impregnated reflectin film.

If the films are stretched too far, for example beyond about 115-120% of their original length, they may require a heat-assisted healing process to return them to their prior dimensions upon the release of tension. In some embodiments, heating, for example at around 80-120° F., is utilized to induce retraction of a stretched film to its previous conformation.

The application/removal of strain to stretch/relax flexible substrates allows for dynamic changes in reflectin thin film coloring and/or IR reflectance. Application of strain to flexible substrates can be implemented by any source of mechanical force. For example, materials to which reflectin films have been applied may be manually stretched manually by a user. Stretching of reflectin materials on flexible target objects can also be accomplished by the use of integrated micromechanical actuators. Various exemplary materials and methods for the integration of actuators and other electronic elements in textiles and other articles are described in U.S. Pat. No. 7,348,645, entitled "Intelligent textile technology based on flexible semiconductor skins," by Xu, issued Mar. 25, 2008; United States Patent Application Publication Number US 20100143848, entitled "Patterning methods for stretchable structures" by Jain and Lin, published Jun. 10, 2010; United States Patent Application Publication Number 20120170232, entitled "Electronic textile with local energy supply devices" by Bhattacharya et al., published Jul. 5, 2012; and U.S. Pat. No. 8,495,762, entitled "Shape changing material," by Hyde et al., issued Jul. 30, 2013.

Summarizing the elastic deformation aspects of the invention, in one aspect the invention encompasses a reflectin thin film deposited onto or otherwise integrated with a flexible substrate, wherein the application of strain forces can stretch the reflectin-substrate assembly such that the thickness of the reflectin film is reduced and the peak reflectance wavelength of the reflectin film is blue-shifted. In another aspect, the invention encompasses a method for decreasing the peak wavelength reflectance of a reflectin thin film adhered to, deposited on, or otherwise integrated with a flexible substrate by the application of strain forces to the reflectin-substrate assembly such that the thickness of the reflectin film is reduced. In one embodiment, the invention comprises a method of changing the IR reflectance of a flexible reflectin film assembly, wherein the thickness of the film in an unstretched state is sufficient to reflect IR wavelengths (e.g. a film thickness of 250 nm or greater), and upon the application of stretching forces, the films is thinned such that its peak reflectance is in the visible spectrum (e.g. a film thickness of less than 250 nm).

2D. Multiple Stimuli. Multiple stimuli may also be used in combination. The invention comprises the use of multiple stimuli which additively or in parallel cause conformational changes in the film which increase or decrease film thickness, for example, chemical, electrical, and/or mechanical stimuli used in combination.

Part 3. Thick and Fixed Films.

3A. Thick Films. In one aspect, the invention is directed to films that are sufficiently thick to reflect substantial amounts of IR radiation and which are of a fixed thickness such that the IR reflectance of the film remains stable. For example, a film of about 250 nm or greater thickness will reflect IR wavelengths, with peak reflectance wavelength increasing as film thickness increases. Thick films are achieved by various means. In one embodiment, the thick film encompasses a single film of about 250 nm or greater in thickness, fabricated using any method known in the art such as spin casting, doctor blading, etc. In an alternative embodiment, the thick film comprises multiple layers of reflectin successively deposited on one another to achieve the desired thickness, for example by successive application of films by doctor blading or spin casting. Such layers may be adhered to each other by the use of an adhering material (e.g. graphene oxide).

3B. Swollen and Fixed Films. As described above, chemically treated films will swell. In one embodiment, the invention comprises a reflectin film that has been chemically treated (e.g. by acidic vapor) and swollen such that its thickness is sufficient to reflect IR wavelengths (i.e. its peak reflectance is within the IR wavelengths), for example, its post-swelling thickness may be 250 nm or greater. This IR-reflective thickness may be maintained by various means. In one embodiment, the swollen film is sealed in a vessel or other structure wherein the chemical stimulus conditions are maintained, for example being sealed in a non-gas permeable coat material or vessel which preserves the acidic/aqueous microenvironment of the reflectins within the coating. The sealing coat material or vessel may comprise any material known in the art which is substantially impermeable to water vapor and other gas exchange, such as polymeric material, self-assembling nano-materials, and other materials suitable as sealing films known in the art, and may be applied, for example, by spraying, dipping, spincasting or other application means. Such airtight/watertight transparent polymeric sealing materials are known in the art, and may be selected such that their optical properties are compatible with the IR-reflective function of the thin film coating, for example substantially transparent materials or IR-transmissive materials may be selected.

In an alternative embodiment, the height of a chemically or otherwise swollen film may be fixed by chemical means. For example, the swollen reflectin film may be suffused with a solution of small molecule material which can be treated (for example by radiation exposure) to create cross-links. Cross-linking creates a rigid matrix in which the reflectin aggregates comprising the film are restricted in their ability to shrink, partially or wholly preserving the increased thickness of the swollen film. Cross-linking materials include those known in the art for cross linking of proteins or other materials, for example cross-linking chemistries as described in Kluger, 2004, "Chemical cross-linking and protein-protein interactions—a review with illustrative protocols," Bioorganic Chemistry 32: 451-472.

Part 4: Textiles.

The invention comprises the use of reflectin thin films in textiles. In some embodiments, the reflectin thin films are utilized in a static or fixed configuration, wherein the IR reflectance of the film is not altered. In another embodiment, the invention is directed to textiles wherein the infrared (IR) reflectance of the material may be dynamically altered, such that the material will controllably transmit or reflect IR as desired, to aid in thermoregulation of objects, such as persons. For example, the novel textiles, compositions, and associated methods disclosed herein may be employed in clothing such as athletic clothing.

As a person engages in athletic activities, heat generated by the body is radiated from the skin or generated from the evaporation of sweat and will build up between the skin and overlaying garments, depending on the transmissive properties of the garment and the temperature of the outside environment. At times the heat is excessive, and its removal is desired. At other times, retention of the heat is desired in order to keep the user comfortable in cool or cold ambient temperatures. Likewise, persons may be subjected to fluctuating environmental temperature conditions. Typically, to deal with activity-based or environmental changes in temperature, persons will thermoregulate by layering multiple garments, and will don and remove them to regulate heat.

Accordingly, it would be advantageous to create textiles wherein the transmissive properties of garments can be dynamically changed in order to shed heat when it is excessive and retain heat when it is desired. The textiles, garments, and associated methods of the invention accomplish this objective by the use of dynamically controlled reflectin thin films. The invention relies on the ability of reflectin films to increase or decrease their reflectance of IR energy under certain conditions, which may be controlled by a user and/or control system.

In one aspect, the textiles of the invention may be reversibly induced to increase or decrease their reflectance of IR wavelengths. For ease of reference, a textile capable of such reversible tuning will be referred to as being "transmissive" when its IR reflectance is in its un-stimulated (thinner film) state, as described below, and will be referred to as "reflective" when its IR reflectance is increased by stimulation (thicker film). However, it is understood that such terms are relative and that the IR reflectance of a particular textile is tuned along a continuum from less to more reflective.

4A. Textiles of the Invention. The textiles of the invention may be any woven, knit, or other flexible material. The textiles may comprise natural or synthetic materials, or blends thereof, for example cotton, silk, hemp, polyester, rayon, nylon, and derivatives of the foregoing. The reflectin thin films may be deposited directly onto finished textiles. Alternatively, the films may be deposited onto fibers, which such fibers are subsequently assembled to create finished textiles. The deposition of reflectin films and their substrates, if any, onto textiles or fibers may be accomplished by any means known in the art. For example, various methods for the deposition of polymer films onto soft surfaces are known, as described by F. Krebs in Fabrication and processing of polymer solar cells: A review of printing and coating techniques, Solar Energy Materials & Solar Cells 93 (2009) 394-412.

In the case of reflectin thin films comprising or applied to textiles, a protective coating may be applied over the reflectin thin film to protect the reflectin thin film from the elements, including exposure to moisture, oxidation, and/or UV light. As stated above, the films will be degraded by exposure to liquid water and protection is required wherever liquid water may be encountered. Protective coatings should be selected to be compatible with reflectin thin films, i.e. they should be optically or IR transmissive and should have a refractive index that will enable reflectin thin films encased within it to efficiently reflect IR wavelengths. Exemplary protective coatings include materials such as graphene, ITO, $SiO_2$ coated ZnO nanorods, and polymer-encased silver nanowires. Flexible coatings are preferred in garments and other objects which are required to bend or fold and in those embodiments where stretching of films is utilized to change film thickness.

4B. Dynamic Films Controlled by Electrical Fields. In one aspect, the invention encompasses textiles comprising electrically controlled dynamic films, which are films accompanied by structures/devices which allow the thickness and reflective properties of the film to be tuned by the use of electrical stimuli.

For example, electrodes may be patterned or deposited onto the textile directly, or onto fibers from which the textile is made. The textile can be switched between transmissive and reflective by removing or applying the electrical stimulus. For example, in one embodiment, the invention comprises the use of thin films incorporating, in contact with, or in proximity to proton-injecting materials (e.g. electrodes) which can apply electric fields, proton currents, or other stimuli capable of moving protons into or out of the thin film protein matrix. In this way, film thickness can be tuned.

Where the unstimulated film has a thickness that reflects in the visible spectrum and the stimulated film has a thickness that reflects in the IR spectrum, the textile can be made IR transmissive or IR reflective as desired.

The textile can be switched between transmissive and reflective by removing or applying the electrical stimulus. Electrical stimulation advantageously may be adjusted and fine-tuned with granularity and precision, and may respond instantaneously or on short time scales, allowing a control system or a user to precisely react to changing temperature (e.g. body temperature or temperature within a garment) in real time by adjusting the stimulus as desired.

Control systems for electrically controlled textiles may take any configuration and are readily implemented by one of skill in the art of sensors and control systems. In one embodiment, control systems incorporate temperature sensors which, upon detection of uncomfortable levels of heat within the garment, will act upon films to increase IR transmission and release heat. Settings which determine system response to temperature (e.g. defining "too warm," etc.) may be fixed, or may be set by the user. Alternatively, the user may manually adjust garment temperature settings on the fly by means of a dial, slide control, or other means incorporated into the garment, or remotely controlled by a mobile device. Control within the garment or other object may be global, or may be autonomously implemented in localized regions of the garment. Control systems, power supply (e.g. a battery) and wiring may be integrated into the garment.

4C. Other Dynamic Textile Treatments. Other stimuli with reversible effects on film thickness/transmissive properties may be employed instead of, or in combination with, the use of electrical stimuli. For example, chemical treatments, such as exposure to acidic vapors may be used to swell films such that they increasingly reflect in the IR wavelengths. Removal of the stimulus can be utilized, or a counteracting stimulus may be applied to reduce the thickness of the films (e.g. active drying) and increase the IR transmissive qualities of the textile. While chemical stimuli, in general, do not act as quickly as electrical signals, these stimuli can be used where responses on longer time scales are acceptable.

4D. Stretched Reflectin Films. In another embodiment, the invention comprises the use of reflectin textiles which can be stretched in order to change their thickness, and thus their IR transmissive properties. In one embodiment, the films of the invention are sufficiently thick in an un-stretched state that they effectively reflect IR wavelengths. When heat removal is desired, increased transmissive properties of the textile can be achieved by applying tension to the film such that it is stretched, causing thinning, which in turn reduces its IR reflectance and allows heat to more efficiently pass through the textile.

The stretched reflectin films of the invention must be sufficiently thick (for example, in the range of 250 nm or greater) to efficiently reflect IR in an un-stretched state. Any thick film may be used, including single layer films and multilayer films.

The thick films of the invention are coated onto elastic textiles, or onto fibers which are then incorporated into textiles. The textiles or fibers, as the case may be, must have sufficient elasticity or "give" to respond to tension by deforming. The garment or other item into which the textile is incorporated may further comprise a tension-inducing structure that, when heat transmission is desired, applies sufficient tension to the textile to thin the film and reduce its IR reflectance. This can be accomplished by any number of structures. For example, micromechanical structures guided by a computerized control system may be used to apply localized and precise tension to sections of the textile to effect the desired change in film thickness. In another embodiment, macro features are incorporated into the garment such as pulls, tabs, drawstrings, and other such features which allow a user to pull and apply mechanical tension to a large swath of material, which may be subsequently held in place by fasteners such as snaps, VELCRO™, etc.

4E. Passive Systems. In one embodiment, passive systems may be employed to effect the desired stretching. For example, most materials tend to elongate upon heating. Accordingly, films can be deposited onto substrates which increase in size when heated, stretching the overlaying reflectin films. In this way, by careful tuning of the substrate material and the elasticity of the reflectin film, the films can automatically respond to heat by stretching, increasing IR transmission and releasing heat from the garment or other structure comprising the reflectin textile.

4F. Exemplary Textile Objects of the Invention. The various textile embodiments of the invention may be applied in numerous contexts. In one aspect, the invention comprises the textiles described herein. In another aspect, the invention comprises items which incorporate the disclosed textiles. In another aspect, the invention comprises methods of making and using the textiles disclosed herein.

As set forth above, one implementation of the systems described herein is in the context of high-performance athletic wear, such as shorts, shirts, warm-up jackets, tank tops, sweatshirts, sweatpants, helmet liners, etc. The reflectin-based systems described herein are functionally IR "venting systems" that can be opened or closed to retain or release heat. These IR vents can be placed throughout the garment, or may be placed at strategic locations where body heat is more pronounced, such as armpits and upper back areas.

The IR venting systems of the invention are not limited to athletic gear, and may be used in any object comprising soft materials such as casual clothing, headwear, bed sheets and blankets, curtains and shades, tents, tarps, furniture coverings etc.

Part 5. Building Materials.

Heating and cooling of buildings constitutes a major expense. In some cases it is advantageous to increase the IR reflectance of a surface on the interior or exterior of a building. For example, in climates where excessive heat is encountered, IR reflective coatings applied to the exterior of a building surface will reduce the heating of the building by reflecting IR wavelengths. In colder climates, IR reflective coatings can be used to reduce heat loss from a room interior. Provided herein are materials which can be used for such thermal management.

The reflectin thin films of the invention may be utilized in any number of building materials. "Building materials," as used herein, broadly encompasses any material used in the fabrication of a structure. Exemplary building materials include panels, tiles, shingles, window panes, awnings, roofing materials, flooring materials, etc. In some embodiments, the reflectin thin films of the invention are applied (directly or indirectly with intervening layers) to a surface of the material, such as a ceramic tile or glass pane. In other embodiments, the reflectin thin films of the invention are applied to a component or constituent of a building material, such as a fiber or particulate, which is then assembled, fabricated, or otherwise incorporated into a finished building material. While the invention is advantageously directed to materials as used in buildings, it will be understood that the materials and associated methods disclosed herein may be broadly applied to any structure or manufactured object, such as automobiles, aircraft, housings for equipment or instruments, ducts, pipes, etc.

5A. Protective Coatings on Reflectin Films. In the case of reflectin thin films applied directly to building materials or constituents of building materials, a protective coating may be applied over the reflectin thin film to protect the reflectin thin film from the elements, including exposure to moisture, oxidation, and/or UV light. Such coatings should be selected to be compatible with reflectin thin films, i.e. they should be optically or IR transmissive and should have a refractive index that will enable reflectin thin films encased within it to efficiently reflect IR wavelengths. Exemplary protective coatings include materials such as graphene, ITO, $SiO_2$ coated ZnO nanorods, and polymer-encased silver nanowires. The coating may also serve as a gas-impermeable sealant which preserves an optimal hydration/ionic environment of the reflectin film, for example as in electrically stimulated systems and for maintaining the thickness of chemically swollen films.

5B. Paints and like coating incorporating reflectin films. In some embodiments, the reflectin thin films of the invention are incorporated into coatings, which are then applied to a building material. The coatings may be created by mixing discreet particulates comprising reflectin thin films with a carrier, such a solvent. The particulates may comprise pieces of reflectin thin film, or may comprise particulate substrates to which the thin films have been applied or adhered. Exemplary substrates include polymeric particles, natural materials such as clay or sand, or any other surface to which reflectin thin films may be applied or adhered. The carrier will typically be a combination of solvent and binder which can be applied to a surface, whereafter the solvent will evaporate and the binder will form a durable film, for example as in a paint, lacquer, varnish, or similar composition. The carrier may be selected from any number of coating compositions known in the art, and should be selected so as to be compatible with the function of the reflectin films, i.e. the carrier should be essentially optically or IR transmissive and should have a refractive index that will enable reflectin thin films encased within it to efficiently reflect IR wavelengths. Such selection may be readily made by one of skill in the art utilizing the known optical properties of the carrier and the reflectin thin films. Reflectin thin films incorporated into carriers may be painted, sprayed, or otherwise applied to building materials.

5C. Static IR Coatings. In one embodiment, the reflectin building materials of the invention have a fixed or static IR reflectance. The static materials of the invention may be used in numerous applications. For example, in warm climates, such materials may be utilized to prevent heating of a structure. For example, roofing materials comprising IR-reflecting reflectin thin films may be used to reduce thermal load of the building. Likewise, panels or paints comprising IR-reflecting reflectin thin films may be used on exterior walls, especially south-facing walls, to reduce thermal load. Additionally, IR-reflecting reflectin thin films may be applied as transparent or semi-transparent coatings for windows to prevent IR radiation ingress to building interiors.

In cooler climates, the materials of the invention may advantageously be used to prevent heat loss, especially in building interiors. For example, interior walls and ceilings, interior surfaces of window panes, and other surfaces may comprise IR-reflecting reflectin thin films to prevent heat transmission (e.g. windows) or absorbance (e.g. walls), aiding in the retention of heat within interior spaces.

5D. Dynamic IR Reflectance Utilizing an Electrical Stimulus. In another aspect, the building materials of the invention may reversibly be induced to increase or decrease their reflectance of IR wavelengths. In one aspect, the invention encompasses building materials comprising electrically controlled dynamic films, which are films accompanied by structures/devices which allow the thickness and reflective properties of the film to be tuned by the use of electrical stimuli. The building material can be switched between transmissive and reflective by removing or applying the electrical stimulus to increase or decrease the thickness, and thus the IR reflectance, of the film (or to manipulate the transparency and/or the color of the film, if peak reflectance is shifted within or into the visible spectrum).

(001) Control systems for electrically controlled materials may take any configuration and are readily implemented by one of skill in the art of sensors and control systems. In one embodiment, control systems may incorporate temperature or IR-sensors which, upon detection of undesirable levels of heat or IR radiation in the target space, will act upon films to increase IR transmission/absorbance and release heat.

(002) The dynamic reflectin films of the invention are especially well suited to use on window panes. Windows are a major source of undesirable heat gain and heat loss. Seasonal and diurnal changes in incoming solar radiation mean that a particular window will, at some times, be allowing too much heat into the structure and at other times will be allowing too much heat to escape. Accordingly, dynamically controlled IR reflectance of window panes is highly desirable. Reflectin films along with associated electrodes or other structures to inject and withdraw protons from the films may be fabricated onto window panes, or incorporated within window panes, allowing control over IR transmission by the window. Such panes will typically be glass, but it is understood that the dynamic reflectin films of the invention may be applied to any window material, for example polycarbonate and other polymeric materials (e.g. as used in skylights). The electrodes and control systems utilized to dynamically tune IR reflectance of thin films applied to windows may be adapted from prior art "smart glass" systems, as known in the art, wherein electrically switchable properties of glass or glass coatings are manipulated using changes in current or electric filed. As above, transparent, watertight or gas-impermeable films or coatings may be placed over the reflectin films and electrode assemblies to maintain their hydration/ionic state and to protect them from the elements.

5E. Passively Controlled Elastic Systems. In another embodiment, passively controlled elastic systems may be employed, comprising elastic reflectin films deposited on materials that change conformation in response to heating and cooling. As stated above, most compositions tend to elongate upon heating. Accordingly, films can be deposited onto substrates which increase in size when heated, stretching the overlaying reflectin films. In this way, by careful tuning of the substrate material and the elasticity of the reflectin film, the films can automatically be stretched, increasing IR transmission, as higher temperatures are reached, for example to release heat from a structure.

Part 6. Infrared Camouflage.

The scope of the invention further encompasses materials, methods, and systems which employ reflectin thin films to effect various camouflage applications and dynamic changes in coloring and/or IR reflectance.

In one embodiment, the reflectin thin films are deposited onto flexible substrates, such as a tape. A tape comprises a planar material having a top surface and a bottom surface.

The top surface may be coated with a reflectin thin film, while the bottom surface comprises an adhesive. The adhesive may be any adhesive known in the art, including drying adhesives, contact adhesives, pressure-sensitive adhesives, and hot melt adhesives. The tape may comprise sheets, or as tapes are commonly supplied, strips, for example strips of 1-10 cm in width. An exemplary tape of the invention is FEP tape (for example, manufactured by McMaster-Carr). In some embodiments, it is preferred that the substrate be substantially transparent or visually unobtrusive in the visual spectrum.

6A. Infrared Patterns. In one embodiment, the reflectin tapes of the invention are used to create patterns which are visible when viewed with infrared imaging technologies, such as image intensification night vision glasses (for example, which utilize wavelengths of 700-1500 nm) or thermal imaging cameras (for example with utilize wavelengths of 900-14,000 nm). In this embodiment, pieces of IR-reflective reflectin tape are applied to a surface, for example, in a camouflage application, as described below. Advantageously, IR-reflective reflectin thin films are substantially transparent in visible light (i.e. they do not reflect a color and are generally see-through). When utilized with a substantially transparent substrate, such as FEP tape, the resulting reflectin tape will be unobtrusive or invisible, such that it may be applied to a surface (such as a printed fabric) without obscuring the underlying print or pattern on the surface.

In one implementation of the invention, pieces of IR-visible reflectin tape are shaped and arranged on a surface to create an IR camouflage pattern, i.e. a pattern that helps obscure an object when it is being imaged using an IR-imaging modality, such as night vision goggles. One means of concealment that is commonly employed in camouflage is the use of disruptive patterning, i.e. contrasting patterns that break up the shape or outline of the object being camouflaged. Accordingly, IR-reflective reflectin tape can be cut into patches having irregular shapes or shapes known in the art of camouflage patterns. Such patches can be created by any process known in the art, such as die cutting or laser cutting. In some embodiments, the IR-reflective reflectin tape is adhered to a backing material such as a waxy paper or like stiff surface to facilitate cutting. The patches can then be adhered to an object in a camouflaging pattern to create disruptive patterning that makes the object harder to detect using IR imaging. Reflectin tapes can be used to make such IR camouflage patterns on any number of objects, especially military items, such as uniforms, vehicles, aircraft, polymeric wraps for vehicles or aircraft, tents and other objects. The reflectin tape IR camouflage of the invention is especially amenable to use on fatigues, tarps, tents, and other objects made of textiles. Advantageously, reflectins tapes can be adhered to textiles and are flexible, such that they can be applied to fatigues without restricting the user's ease of movement. Additionally, reflectin tapes may be substantially transparent, such that printed camouflage patterns on the military clothing are not obscured by the overlaying arrangement of reflectin patches.

Dynamic Changes in Coloring and IR Visibility. As described above in the context of thermal management, dynamic changes in the coloring and IR visibility of films applied to flexible substrates can be implemented by stretching and relaxing of the substrate. In one aspect, the invention comprises reflectin tapes comprising a deformable substrate, which such tapes are capable of changing color and/or IR reflectance upon being stretched. In another aspect, the invention encompasses methods of achieving such changes in color or IR reflectance by applying tension to a reflectin tape comprising a deformable substrate.

For example, a reflectin film which reflects in the IR region of the spectrum will be inconspicuous or invisible in visible light. Upon stretching, the film will thin and will begin to reflect at shorter wavelengths, so that if sufficiently stretched, it will become visible. Likewise, a reflectin film that reflects in the visible spectrum can be stretched such that it changes color (for example, from orange to blue). Stretching of reflectin tapes to effect changes in color and/or IR visibility can also be accomplished by manual application of tension or the use of integrated micromechanical actuators under the control of a computerized control system.

In a related embodiment, the substrate of the reflectin film is deformable but not elastic, such that the release of applied tension does not substantially restore the original dimensions of the tape. However, if a substrate comprising a restorable material is utilized, the substrate and overlaying reflectin film can be returned to their original dimensions and the original optical properties of the tape can be restored. For example, if the substrate comprises a heat-shrinkable material, application of the appropriate heating will shrink the deformed substrate and overlaying reflectin film. For example, stretched reflectin-FEP tape can be gently heated, for example by use of a heat gun, to "heal" the deformed tape back to its original dimensions and to restore the optical properties the tape had prior to stretching.

While the foregoing description is directed to the use of reflectin tapes, it will be understood that similar results can be attained with reflectin films that are present on a flexible substrates that does not comprise an integral adhesive surface.

Part 7. Examples.

EXAMPLE 1

IR Camouflage Using Stretched Reflectin Films on FEP Tape

Cephalopods, such as the squid *Doryteuthis* (Loligo) *pealeii* and the cuttlefish *Sepia officinalis*, are renowned as masters of disguise. These animals can alter their patterning, coloration, shape, and texture, enabling them to emulate nearly any object or environment. Cephalopods' remarkable camouflage capabilities stem from the unique organization of their skin, which consists of transparent dermal layers containing cells known as iridophores, leucophores, and chromatophores. These cells function in concert to control cephalopod skin coloration, with the iridophores/leucophores modulating the reflection of light and the chromatophores modulating the transmission of light. Moreover, the mechanical flexibility of the dermal layers affords an additional level of control by allowing cephalopods to reconfigure their skin morphology in three dimensions. The sophisticated natural design of cephalopod skin thus endows it with remarkable dynamic adaptability, which is enviable from the viewpoint of not only artificial but also natural systems.

(003) The mechanisms that cephalopods employ to induce optical changes in iridophores and chromatophores are particularly fascinating. Iridophores are actuated primarily via chemical means. The iridophores' plasma membrane folds to encompass lamellar-like platelets from a protein known as reflectin, which alternate with extracellular space to form Bragg reflector-like structures. Reversible phosphorylation of reflectin changes the size and spacing of the lamellae that make up the reflector, dynamically shifting the iridophores' reflectance across the visible spectrum. On the other hand, chromatophores are actuated primarily via mechanical means. Chromatophores contain a network of tethered, reflectin-filled pigment granules and are fringed by radial muscle fibers, which expand these cells from barely visible spherical points to thin colored plates. This areal expansion enables chromatophores to function as dynamic spectral filters. The unique properties of iridophores and chromatophores have inspired efforts seeking to develop biomimetic camouflage that functions not only in the visible but also in the infrared regions of the electromagnetic spectrum.

Due to their crucial role in cephalopod skin cells, reflectins have been touted as particularly promising materials for next generation optical devices and biomimetic stealth technologies. Therefore, it is quite surprising that only a small number of reports (five total) have investigated the self-assembly, optical, and electrical properties of these proteins in vitro. Moreover, the mechanical properties of reflectins remain virtually unexplored, and the effect of mechanical stimuli on the optical functionality of reflectin films is not known. Given the recent discovery that reflectin is a primary component of pigment granules in mechanically-actuated chromatophores, such studies are particularly salient and may provide improved insight into reflectin's role in vivo.

Herein, a new class of reflectin-based biomimetic infrared camouflage systems that are mechanically reconfigurable is described. Standard film fabrication protocols were used to coat conformable and adhesive fluorinated ethylene propylene (FEP) substrates with reflectin films; the reflectance of the resulting coatings spans both the visible and infrared regions of the electromagnetic spectrum. The adhesive substrates were used to endow fabrics with precisely predetermined and arbitrary infrared reflective patterning. Subsequently the coloration of the coated substrates between the infrared and the visible was modulated with a simple mechanical stimulus. Finally, it is shown that that the reflectin-coated substrates are capable of self-healing after deformation upon gentle heating. In their totality, the findings constitute a foundation for the next generation of arbitrarily-deployable infrared camouflage systems and may hold implications for the in vivo function of the reflectin protein family.

First, a heterologously expressed histidine-tagged *Doryteuthis* (Loligo) *pealeii* reflectin A1 isoform was produced in *E. coli* according to previously reported protocols [Ordinario et al, *Nat. Chem.* 2014, 6, 596-602 and Phan et al., *Adv. Mater.* 2013, 25, 5621-5625]. Crude reflectin was extracted from *E. coli* inclusion bodies. The protein was then sequentially purified by immobilized metal affinity chromatography under denaturing conditions and HPLC. The identity of the protein was confirmed by in-gel tryptic digestion and tandem mass spectrometry. Notably, the optimized expression and purification procedure yielded ~1 g of reflectin per liter of *E. coli* cell culture, with a purity of over 99%. This high yield and excellent purity facilitated subsequent fabrication of protein-based coatings on flexible substrates.

Reflectin films were fabricated on fluorinated ethylene propylene (FEP) substrates. In a typical procedure, a strip of Fluorinated Ethylene Propylene (FEP) tape (McMaster-Carr) was first adhered to a glass substrate (Fisher), in preparation for coating. Spacer rails of Teflon tape (McMaster-Carr) were then applied to the edges of the FEP tape. The tape was coated with graphene oxide (Graphene Marketplace) on a hot plate at 60° C. to provide an adhesion layer for the protein. The reflectin protein solution was then cast onto the FEP tape in front of the blade, which was translated at a constant speed across the surface to produce thin films. To promote water evaporation and uniform film formation, the coating procedure was performed at 80° C. The film thickness was controlled by varying the reflectin concentration.

(004) FEP was chosen as the substrate material due to its transparency, chemical inertness, flexibility, conformability, temperature stability, and tensile strength. Moreover, FEP is commercially available as sticky tape, with an adhesive layer on one side, making it straightforward to bond this material to arbitrary objects. In brief, a thin layer (<5 nm) of graphene oxide was coated directly onto the FEP substrates, forming negatively charged and amphiphilic surfaces that were well suited for the assembly of positively charged reflectin films. A doctor blade approach was used to spread reflectin directly onto the graphene oxide-coated surfaces. This process enabled the fabrication of relatively uniform reflectin films on adhesive polymer substrates.

(005) Next, the optical properties of the coated substrates were investigated and characterized. Note that in this example, the index of refraction of the FEP tape is less than that of reflectin (FEP tape having an index of refraction of about 1.33), necessitating different optical property calculations as those for reflectins deposited on substrates having a higher index of refraction. For a typical reflectin film on FEP, the coated substrate featured blue coloration over an area of square centimeters, with a peak reflectance wavelength of ~400 nm. The peak reflectance corresponded to a theoretical reflectin film thickness of ~65 nm, which was in excellent agreement with the experimentally measured value of ~64 nm. Analysis indicated that the reflectance of the coated substrates was governed by well-known thin film interference theory.

Next, infrared-reflecting substrates were prepared by fabricating thicker reflectin films on FEP. The films were highly transparent. The reflectance spectrum of the 180 nm-thick coating on FEP featured a peak wavelength of ~1100 nm, indicating that the coloration of the coated substrates could be readily shifted into the near infrared simply by increasing the reflectin films' thickness.

Next was demonstrated that the infrared-reflecting, reflectin-coated FEP tape could enhance the camouflage properties of any object under infrared visualization. Inspiration was sought from the organization of cephalopod skin, where different arrangements of ellipsoidal chromatophores lead to a virtually unlimited array of colors and geometric patterns. Cloth from a camouflage fatigue was modified with an arbitrary predetermined infrared-reflecting pattern fashioned from the reflectin-coated FEP tape.

The substrates were visualized with both a standard camera under illumination with either white light or infrared light. The cloth featured an adhered rectangular piece of FEP tape without a reflectin coating, an adhered checkerboard pattern of five infrared-reflecting FEP tape squares with a reflectin coating, and a plant leaf. In visible light, the uncoated and reflectin-coated pieces of FEP tape appeared clear and were difficult to distinguish from one another. However, all six pieces of tape were quite distinct from the green plant leaf. Under infrared visualization, the uncoated FEP tape and the underlying fatigue were no longer visible, while the checkerboard pattern of reflectin-coated FEP tape and the leaf were quite distinct and appeared bright. Together, these images indicated that the reflectin-coated FEP tape could be deployed to produce arbitrary infrared-reflective patterning on objects with virtually any shape, roughness, geometry, or size.

Next it was demonstrated that a simple exogenous stimulus could modulate the coloration and reflectance of the coated substrates. Inspiration was drawn from both previous demonstrations of mechanochromism for photonic gels and from the function of reflectin-containing pigment granule networks of chromatophores, which cephalopods dynamically expand and contract to alter the patterning and coloration of their skin. Thus, the effect of an applied uniaxial strain on the optical properties of the reflectin-coated FEP tape was investigated.

In the absence of an applied uniaxial strain, under standard imaging conditions, the coated substrate appeared clear, and the underlying fatigue was readily visible. However, under infrared imaging conditions, the substrate appeared bright, and the underlying camouflage fatigue appeared dark, effectively functioning as an internal standard. As expected, the unstrained tape possessed a reflectance peak in the near infrared region of the electromagnetic spectrum, which was centered at ~980 nm. This peak reflectance wavelength corresponded to a theoretical reflectin film thickness of ~162 nm, which was in good agreement with the experimentally measured value of ~160 nm.

Where the tape has been subjected to a uniaxial strain (tension) εx of ~0.57, under standard imaging conditions, the coated substrate acquired an orange color, and the underlying camouflage fatigue was obscured by the now-visible reflectin film. Moreover, under infrared imaging conditions, the brightness of the tape was reduced by ~40%. The reflectin film now featured a reduced thickness of ~120 nm, and a blue-shifted peak reflectance wavelength of ~705 nm in the visible region of the electromagnetic spectrum. The peak reflectance wavelength corresponded to a theoretical film thickness of ~116 nm, which was in good agreement with the experimentally measured value.

Based on measurements and observations, a simple model is proposed that accounts for the optical properties of reflectin-coated FEP substrates. Given that aggregated reflectin's behavior resembles that of a gel phase, the application of a uniaxial strain (tension) to the reflectin-coated FEP tape stretches not only the relatively rigid tape but also the softer overlaid film. Therefore, under a strain of εx=ΔL/L, the film will be elongated by a factor of 1+ε, from L to L+ΔL (where L is the initial length and ΔL is the change in length). Due to the Poisson effect, the reflectin film's thickness will simultaneously decrease by a factor of 1−νε, from t to t−Δt (where t is the initial thickness, Δt is the change in thickness, and ν is Poisson's ratio). An applied tension caused a strain of εx=~0.57 and decreased the thickness by ~25%. This experimental thickness decrease was in agreement with the theoretically predicted one of ~27% (assuming a nearly ideal Poisson's ratio of 0.48). This calculation supported the applicability of this straightforward model to the optomechanical behavior of reflectin-coated FEP substrates.

To demonstrate the general applicability of the approach, modulating the reflectance of the strained (and deformed) reflectin films with alternative stimuli was explored, inspired by the general mechanical adaptability and malleability of cephalopod skin. Gentle annealing with a heat gun returned the plastically deformed FEP substrates (and presumably the overlaid reflectin films) to their initial, unstretched state. This change in substrate geometry was accompanied by a shift of the coloration (and reflectance) back from the visible to the near infrared. In essence, the deformed reflectin films could be "healed" to fully recover their original optical properties.

In summary, described is a new class of biomimetic infrared camouflage system, which possess a number of favorable and unique features relative to other infrared stealth technologies. First, the readily-accessible fabrication strategy relies upon commercial materials and does not require specialized facilities or equipment, making it straightforward to coat optically-uniform, infrared-reflecting films on flexible substrates over square centimeter areas, which is technically quite challenging. Second, the reflectin-coated FEP substrates are adhesive, soft, and conformable, so they can be applied to surfaces or substrates with varied roughnesses, shapes, sizes, and geometries, much like common household tape or stickers. Third, the breadth of the reflectance peaks for the coated substrates ensures that their appearance will be only weakly dependent on the viewing angle under infrared visualization, which is highly advantageous in practical stealth situations. Fourth, the effective visibility of the reflectin-coated substrates, when viewed under either optical or infrared illumination, can be tuned via the application of a uniaxial strain, rather than a harsh chemical stimulus. The inventors are aware of no other examples where a soft material's infrared reflectance is modulated between the visible and the infrared via the application of exogenous mechanical stimuli. Fifth, the substrates can be self-healed through the application of gentle heating, laying the groundwork for the development of damage-resistant infrared camouflage devices whose reflectance can be controlled with multiple stimuli. Finally, the work represents one of only two examples of the translation of the principles underlying cephalopod adaptive coloration specifically to infrared, rather than visible, camouflage. Overall, the mechanically reconfigurable infrared invisibility stickers represent a crucial step forward on the path to biomimetic adaptable optical devices and practical camouflage technologies.

Finally, the optomechanical behavior reported here for reflectin may hold implications for understanding this protein's in vivo function in both iridophores and chromatophores. The current work demonstrates, for the first time, that the optical properties of aggregated reflectin ensembles are readily influenced by mechanical stimuli. The findings hint at a potential role for reflectin's optomechanical functionality in vivo, which is particularly timely within the context of the recent discovery that reflectin is a key component in chromatophores' mechanically-actuated pigment granule networks. In addition, reflectin's mechanical properties may be relevant for better understanding its biochemically-actuated condensation within the crowded environment of folded iridophore membranes. Taken together, the studies underscore the diverse biological roles and rich materials properties of the reflectin protein family, which certainly warrant substantial additional exploration.

Detailed Description of the Reflectin Film Thickness Calculations: The theoretical film thicknesses were calculated based on thin-film interference theory (e.g. as described in A. Lipson, S. G. Lipson, H. Lipson, *Optical Physics*, 4th ed., Cambridge University Press, Cambridge, 2010). Our system closely follows the well-known oil on water example, due to reflectin's refractive index of ~1.5417,18 and FEP's refractive index of ~1.33.25-27 Thus, at non-normal incidence, the reflected light obeys Equation 2:

$$\left(m - \frac{1}{2}\right) * \lambda = 2 * n * d * \cos(\beta) \qquad \text{Equation 2}$$

where m is an integer that describes wavelength order, l is the peak reflected wavelength, n is the refractive index of the film, d is the film thickness, and b is the angle in the film. Note that the graphene oxide adhesion layer used in the experiments was very thin, so it did not dramatically influence the calculated values. The refractive indices used for the calculations were obtained from the literature [Ordinario et al, *Nat. Chem.* 2014, 6, 596-602 and Phan et al., *Adv. Mater.* 2013, 25, 5621-5625; R. R. Thomas, in *Fluoropolymers 2: Properties* (Eds: G. Houghham, P. E. Cassidy, K. Johns, T. Davidson), Kluwer Academic/Plenum Publisher, New York, 1999; A. J. Bur, in *Fluoropolymers* (Ed: L. A. Wall), J. Wiley & Sons, Hoboken, 1972] and confirmed at using a Filmetrics F20-UV spectrophotometer.

Description of the Imaging and Stretching Experiments: The reflectin-coated FEP tape was mounted between two anchoring substrates. The camouflage-patterned fabric was then placed underneath the reflectin-coated substrate, highlighting the active area of the film. The film was first imaged in the absence of strain with a standard camera under white light illumination, and then again with an infrared camera under infrared light illumination. The film was subsequently stretched, inducing a uniaxial strain (tension) and imaged again with the standard and infrared cameras, as described above.

Description of the Heat-Induced Substrate Regeneration Experiments: The reflectin-coated FEP tape was stretched as described above. After the final desired strain was reached, the sample was regenerated by direct exposure to hot air from a heat gun (Grizzly Industrial, Inc., model H0800) for a maximum duration of 2 seconds at the gun's "low" setting.

All patents, patent applications, and publications cited in this specification are herein incorporated by reference in their entirety to the same extent as if each independent patent, patent application, or publication was specifically and individually indicated to be incorporated by reference. The disclosed embodiments are presented for purposes of illustration and not limitation. While the invention has been described with reference to the described embodiments thereof, it will be appreciated by those of skill in the art that modifications can be made to the structure and elements of the invention without departing from the spirit and scope of the invention as a whole.

What is claimed is:

1. A method of modulating the infrared reflectance of a reflectin film by application of one or more stimuli,
   comprising exposing the reflectin film to an electrical stimulus, a mechanical stimulus, or both;
   wherein the reflectin film consists essentially of reflectin protein; and
   wherein a change in the infrared reflectance of the film occurs as a result of changes in thin film interference effects in response to the stimulus.

2. The method of claim 1, wherein
   the one or more stimuli comprises a mechanical stimulus.

3. The method of claim 2, wherein
   wherein the reflectin film is adhered to a flexible substrate; and
   the mechanical stimulus comprises tension applied to the flexible substrate such that the reflectin film is stretched and deforms to assume a thinner conformation than it had prior to the application of the tension.

4. The method of claim 3, wherein
   wherein the flexible substrate and reflectin film are stretched to 115% or less of their original length.

5. The method of claim 3, wherein
   the thickness of the reflectin film prior to application of the tension is such that its peak reflectance wavelength is above 700 nm and the thickness of the reflectin film during the application of tension decreases such that its peak wavelength reflectance is less than 700 nm.

6. The method of claim 3, wherein
   the flexible substrate is a textile.

7. The method of claim 2, wherein
   the mechanical stimulus is applied by micromechanical actuators.

8. The method of claim 2, wherein
   the one or more stimuli further comprises a chemical stimulus.

* * * * *